US005479564A

United States Patent [19]

Vogten et al.

[11] Patent Number: 5,479,564

[45] Date of Patent: Dec. 26, 1995

[54] METHOD AND APPARATUS FOR MANIPULATING PITCH AND/OR DURATION OF A SIGNAL

[75] Inventors: Leonardus L. M. Vogten; Chang X. Ma, both of Eindhoven, Netherlands; Werner D. E. Verhelst, Brussels, Belgium; Josephus H. Eggen, Eindhoven, Netherlands

[73] Assignee: U.S. Philips Corporation, New York, N.Y.

[21] Appl. No.: 326,791

[22] Filed: Oct. 20, 1994

Related U.S. Application Data

[63] Continuation of Ser. No. 924,863, Aug. 3, 1992, abandoned.

[30] Foreign Application Priority Data

Aug. 9, 1991 [EP] European Pat. Off. .............. 91202044

[51] Int. Cl.[6] .............................................. G01L 9/00

[52] U.S. Cl. ........................ 395/2.76; 395/2.77; 395/2.74

[58] Field of Search .................................. 395/2.67, 2.7, 395/2.76, 2.77, 2.74, 2.75; 381/36, 38, 40, 51, 53

[56] References Cited

U.S. PATENT DOCUMENTS

| | | | |
|---|---|---|---|
| 3,369,077 | 2/1968 | French et al. | 381/38 |
| 4,282,405 | 8/1981 | Taguchi | 381/49 |
| 4,559,602 | 12/1985 | Bates, Jr. | 364/487 |
| 4,596,032 | 6/1986 | Sakurai | 381/51 |

(List continued on next page.)

FOREIGN PATENT DOCUMENTS

| | | |
|---|---|---|
| 0363233 | 9/1989 | European Pat. Off. . |
| 0372155 | 6/1990 | European Pat. Off. . |
| 8303483 | 10/1983 | WIPO . |
| 9003027 | 3/1990 | WIPO . |

OTHER PUBLICATIONS

D. Malah, "Time–Domain Algorithms for Harmonic Bandwidth Reduction and Time Scaling of Speech Signals", IEEE Transactions on ASSP, vol. 27, Apr. 1979, pp. 121–133.

Parsons, *Voice and Speech Processing*, McGraw–Hill, New York, N.Y., 1987, pp. 38–39.

Translation of EPO 0,363,233, Apr. 1990, Hamon.

D. J. Hermes, "Measurement Of Pitch By Subharmonic Summation", Journal of the Acoustical Society of America, vol. 83 (1988), No. 1, pp. 257–264.

E. P. Neuburg, "Simple pitch–dependent algorithm for high–quality speech rate changing", Journal Of The Acoustical Society Of America, vol. 63, No. 2, Feb. 1978, pp. 624–625.

Takasugi et al., "Function of SPAC (Speech Processing System by Use of Autocorrelation Function) and Fundamen- (List continued on next page.)

*Primary Examiner*—Allen R. MacDonald
*Assistant Examiner*—Michael A. Sartori
*Attorney, Agent, or Firm*—Richard A. Weiss

[57] ABSTRACT

Method and apparatus for manipulating an input signal (e.g. an audio (equivalent) signal) to obtain an output signal having a different pitch and/or duration. The method includes (a) positioning a chain of successive overlapping time windows with respect to the input signal; (b) deriving segments signals from the input signal and the windows; and (c) synthesizing the output signal by chained superposition of the segments signals. Each of the windows (except for the first window in the chain) is positioned by incrementing a position of the window from a corresponding position of a preceding window in the chain by a time interval. The time interval is substantially equal to a local pitch period for a portion of the input signal with respect to which the window is positioned. Accordingly, each of the windows of the chain (except for the first window) is positioned so that it begins at a predetermined time interval from a preceding window in the chain. The apparatus includes units for carrying out each of these processes.

28 Claims, 9 Drawing Sheets

OTHER PUBLICATIONS

| | | | |
|---|---|---|---|
| 4,624,012 | 11/1986 | Lin et al. | 381/51 |
| 4,700,393 | 10/1987 | Masuzawa et al. | 395/2.76 |
| 4,704,730 | 11/1987 | Turner et al. | 381/36 |
| 4,764,965 | 8/1988 | Yoshimura et al. | 381/43 |
| 4,845,753 | 7/1989 | Yasunaga | 381/38 |
| 4,852,169 | 7/1989 | Veeneman et al. | 381/38 |
| 4,864,620 | 9/1989 | Bialick | 381/34 |
| 5,001,745 | 3/1991 | Pollock | 379/96 |
| 5,111,409 | 5/1992 | Gasper et al. | 395/152 |
| 5,157,759 | 10/1992 | Bachenko | 395/2 |
| 5,175,769 | 12/1992 | Hejna, Jr. et al. | 381/34 |
| 5,220,611 | 6/1993 | Nakamura et al. | 381/48 |
| 5,230,038 | 7/1993 | Fiedler et al. | 393/2 |
| 5,321,794 | 6/1994 | Tamura | 395/269 |
| 5,327,498 | 7/1994 | Hamon | 395/2.76 |
| 5,353,374 | 10/1994 | Wilson et al. | 395/2.28 |

OTHER PUBLICATIONS tal Characteristics", The Transactions Of The IECE Of Japan, vol E62, No. 3, 1979, pp. 153–154.

P. Rangan et al., "A Window–Based Editor For Digital Video and Audio", IEEE Computer Soc. Press, Proceedings of the Twenty–Fifth Hawaii International Conference on System Sciences (CAT. No. 91THO394–7), Jan. 7–10, 1992, Hawaii, pp. 640–648, vol. 2.

PRIOR
ART

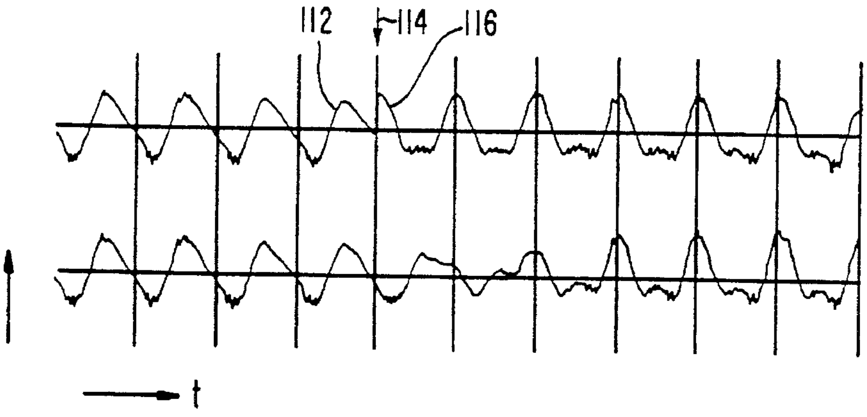
FIG. 11a
FIG. 11b
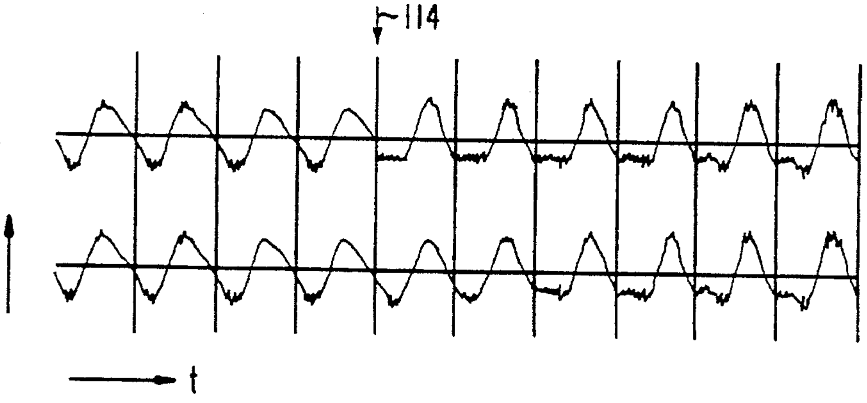
FIG. 12a
FIG. 12b
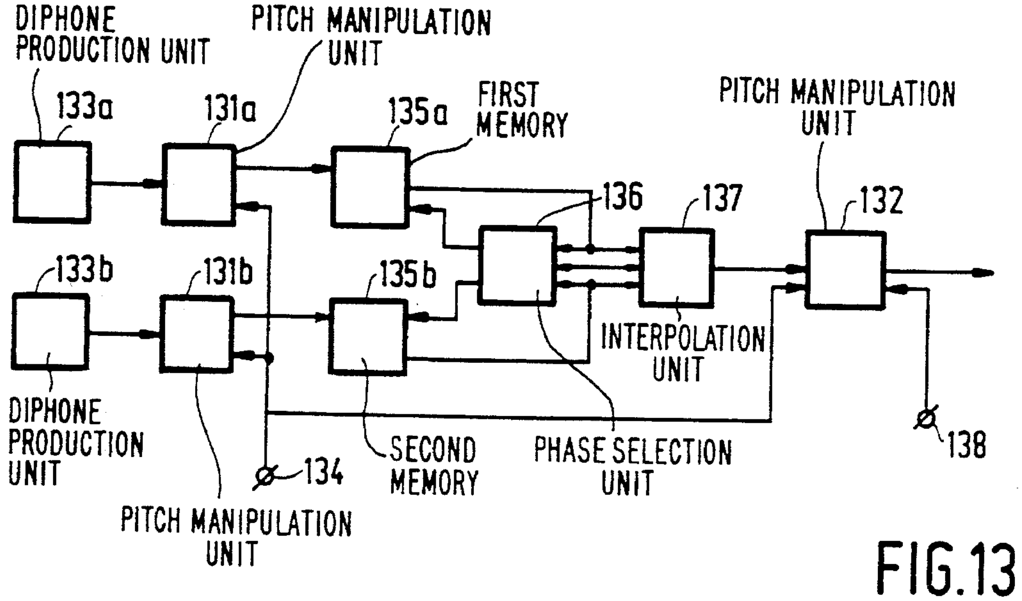
FIG. 13

METHOD AND APPARATUS FOR MANIPULATING PITCH AND/OR DURATION OF A SIGNAL

This is a continuation of prior application Ser. No. 07/924,863, filed on Aug. 3, 1992 now abandoned.

BACKGROUND OF THE INVENTION

The invention relates to a method for manipulating an audio equivalent signal. Such a method involves positioning a chain of mutually overlapping time windows with respect to the audio equivalent signal; deriving segment signals from the audio equivalent signal, each of the segment signals being derived from the audio equivalent signal by weighting the audio equivalent signal as a function of position in a respective window; and synthesizing, by chained superposition, the segment signals.

The invention also relates to a method for manipulating a concatenation of a first and a second audio equivalent signal. Such a method comprise the steps of:

(a) locating the second audio equivalent signal at a position in time relative to the first audio signal, the position in time being such that, over time during a first time interval only, the first audio equivalent signal is active and in a subsequent second time interval only the second audio equivalent signal is active, (b) positioning a chain of mutually overlapping time windows with respect to the first and the second audio equivalent signal, and (c) synthesizing an output audio signal by chained superposition of segment signals derived from the first and/or the second audio equivalent signal by weighting the first and/or the second audio equivalent signal as a function of position in the time windows.

The invention further relates to an apparatus for manipulating an audio equivalent signal. Such a device comprises:

(a) a positioning unit for locating a position for a time window with respect to the audio equivalent signal, the positioning unit feeding the position to (b) a segmenting unit for deriving a segment signal from the audio equivalent signal by weighting the audio equivalent signal as a function of position in the window, the segmenting unit feeding the segment signal to (c) a superposing unit for superposing the signal segment with a further segment signal to form an output signal of the device.

The invention still further relates to an apparatus for manipulating a concatenation of a first and a second audio equivalent signal. Such a device comprises:

(a) a combining unit for forming a combination of the first and the second audio equivalent signal, wherein there is a relative time position of the second audio equivalent signal with respect to the first audio equivalent signal such that, over time, during a first time interval only the first audio equivalent signal is active and during a subsequent second time interval only the second audio equivalent signal is active (b) a positioning unit for locating window positions for time windows with respect to the combination of the first and the second audio equivalent signal, the positioning unit feeding the window positions to (c) a segmenting unit for deriving segment signals from the first and the second audio equivalent signal by weighting the first and the second audio equivalent signal as a function of position in the corresponding windows, the segmenting unit feeding the segment signals to (d) a superposing unit for superposing selected segment signals to form an output signal of the device.

Such methods and apparatus are known from the European Patent Application No. 0363233. That application describes a speech synthesis system in which an audio equivalent signal, representing sampled speech, is used to produce an output (speech) signal. In order to obtain a prescribed prosody for synthesized speech, the pitch of the output signal and the durations of stretches (i.e. portions) of speech are manipulated. This is done by deriving segment signals from the audio equivalent signal, which in the prior art extend typically over two basic periods between periodic moments of the strongest excitation of the vocal cords.

To form, for example, an output signal with increased pitch, the segment signals are superposed, but not in their original timing relation. Rather their mutual center to center distance is compressed as compared to the original audio equivalent signal (leaving the length of the segment signal the same, but the pitch larger). To manipulate the length of a stretch, some segment signals are repeated or skipped during superposition.

The segment signals are obtained from windows placed over the audio equivalent signal. Each window in the prior art preferably extends to the center of the next window. In this case, each time point in the audio equivalent signal is covered by two windows.

To derive the segment signals, the audio equivalent signal in each window is weighted with a window function, which varies as a function of position in the window, and which approaches zero on the approach of the edges of the window. Moreover, the window function is "self complementary" in the sense that the sum of the two window functions covering each time point in the audio equivalent signal is independent of the time point. (An example, of a window function that meets this condition is the square of a cosine with its argument running proportionally to time from minus ninety degrees at the beginning of the window to plus ninety degrees at the end of the window).

As a consequence of this self complementary property of the window function, one would retrieve the original audio equivalent signal if the segment signals were superposed in the same time relation as they are derived. If, however, in order to obtain a pitch change of locally periodic signals (like, for example, voiced speech or music), before superposition, the segment signals are placed at different relative time points, the output signal will differ from the audio equivalent signal. In particular, it will have a different local period, but the envelope of its frequency spectrum will be approximately the same. Perception experiments have shown that this yields a very good perceived speech quality even if the pitch is changed by more than an octave.

The above-mentioned European patent describes the centers of the windows being placed at "voice marks", which are said to coincide with the moments of excitation of the vocal cords. That patent publication is silent as to how these voice marks should be found, although it states that a dictionary of diphone speech sounds with a corresponding table of voice marks is available from its applicant.

It is a disadvantage of the known method that voice marks, representing moments of excitation of the vocal cords, are required for placing the windows. Automatic determination of these moments from the audio equivalent signal is not robust against noise and may fail altogether for some (e.g., hoarse) voices, or under some circumstances (e.g., reverberated or filtered voices). Through irregularly placed voice marks, audible errors in the output signal occur. Manual determination of moments of excitation is a labor intensive process, only economically viable for speech signals which are used often as, for example, in a dictionary. Moreover, moments of excitation usually do not occur in an audio equivalent signal representing music.

SUMMARY OF THE INVENTION

It is an object of the invention to provide for selection of successive intervals for placement of windows which can be performed automatically, is robust against noise and retains a high audible quality for the output signal. The method according to the invention realizes this object because it is characterized in that the windows are positioned incrementally. There is a positional displacement between adjacent windows which is substantially given by a local pitch period length the audio equivalent signal. Thus, there is no fixed phase relation between the windows and the moments of excitation of the vocal cords. For that matter, due to noise, the phase relation will even vary in time. The method according to the invention is based on the discovery that the observed quality of an audible signal obtained in this way does not perceptibly suffer from the lack of a fixed phase relation, and the insight that the pitch period length can be determined more robustly (i.e., with less susceptibility to noise, or for problematic voices, and for other periodic signals like music) than the estimation of moments of excitation of the vocal cords.

Accordingly, an embodiment of the method according to the invention is characterized in that the audio equivalent signal is a physical audio signal and the local pitch period length is physically determined therefrom. In an embodiment of the invention, the pitch period length is determined by maximizing a measure of correlation between the audio equivalent signal and itself shifted in time by the pitch period length.

In another embodiment of the invention, the pitch period length is determined using the position of a peak amplitude in the frequency spectrum for the audio equivalent signal. One may use, for example, the absolute frequency of a peak in the frequency spectrum or the distance between the two different peaks. In itself, a robust pitch signal extraction scheme of this type is known from an article by D. J. Hermes titled "Measurement of pitch by subharmonic summation" in the Journal of the Acoustical Society of America, Vol 83 (1988), No. 1, pages 257–264. Pitch period estimation methods of this type provide for robust estimation of the pitch period length, since reasonably long stretches of the input signal can be used for estimation. Those stretches are intrinsically insensitive to any phase information contained in the signal and can, therefore, only be used when the windows are placed incrementally as in the present invention.

A further embodiment of the method according to the invention is characterized in that the pitch period length is determined by interpolating further pitch period lengths determined for adjacent voiced stretches. Otherwise, the unvoiced stretches are treated just as voiced stretches. Compared to the known method, this has the advantage that no further special treatment or recognition of unvoiced stretches of speech is necessary.

One may determine the pitch period length when an output signal is formed, i.e., "real time". However, when the audio equivalent signal is to be used more than once to form different output signals, it may be convenient to determine the pitch period length only once and to store it with the audio equivalent signal for repeated use in forming output signals.

In an embodiment of the method according to the invention, the audio equivalent signal has a substantially uniform pitch period length, attributed through manipulation of a source signal. In this way, only one time independent pitch value needs to be used for the actual pitch and/or duration manipulation of the audio equivalent signal. Attributing a time independent pitch value to the audio equivalent signal is preferably done only once for several manipulations and well before the actual manipulation. To obtain the time independent pitch value, the method according to the invention or any other suitable method may be used.

A method for manipulating a concatenation of a first and a second audio equivalent signal comprising the steps of:

(a) locating the second audio equivalent signal at a position in time relative to the first audio equivalent signal, the position in time being such that, over time, during a first time interval only, the first audio equivalent signal is active and in a subsequent second time interval only the second audio equivalent signal is active, (b) positioning a chain of mutually overlapping time windows with respect to the first and the second audio signal, and (c) synthesizing an output audio signal by chained superposition of segment signals derived from the first and/or the second audio equivalent signal by weighting the first and/or the second audio equivalent signal as a function of position in the time windows, is characterized in that:

(i) the windows are positioned incrementally, a positional displacement between adjacent windows in the first and the second time interval being substantially equal to a local pitch period length of the first and the second audio equivalent signal; and (ii) the position in time of the second audio equivalent signal is selected to minimize a transition phenomenon representative of an audible effect in the output signal between where the output signal is formed by superposing segment signals derived from either the first or the second time interval exclusively.

Such a method is particularly useful in speech synthesis from diphones, i.e., first and second audio equivalent signals which both represent speech containing the transition from an initial speech sound to a final speech sound. In synthesis, a series of such transitions, each with its final sound matching the initial sound of its successor is concatenated in order to obtain a signal which exhibits a succession of sounds and their transitions. If no precautions are taken in this process, one may hear a "blip" at the connection between successive diphones.

Since, in contrast to the relative phase between windows, the absolute phase of the chain of windows is still free in the method according to the invention, the individual first and second audio equivalent signals may both be repositioned as a whole with respect to the chain of windows without changing the position of the windows. In the abovementioned embodiment, repositioning of the signals with respect to each other is used to minimize the transition phenomena at the connection between diphones, or for that matter, any two audio equivalent signals. As a result blips are typically prevented.

There are several ways of merging the final sound and the first and the initial sounds of the first and second audio equivalent signals, respectively. One way is an abrupt switchover from the first signal to the second signal. A second way is interpolation between individually manipulated output signals or interpolation of segment signals. A preferred way is characterized in that the segments are extracted from an interpolated signal, corresponding to the first and the second audio equivalent signal during the first and the second time interval, and corresponding to an interpolation between the first and the second audio equivalent signals between the first and second time intervals. This requires only a single manipulation.

According to the invention, an apparatus for manipulating an audio equivalent signal comprising:

(a) a positioning unit for locating a position for a time window with respect to the audio equivalent signal, the positioning unit feeding the position to (b) a segmenting unit for deriving a segment signal from the audio equivalent signal by weighting the audio equivalent signal as a function of position in the window, the segmenting unit feeding the segment signal to (c) a superposing unit for superposing the signal segment with a further segment signal to form an output signal of the device is characterized in that the positioning unit comprises an incrementing unit for locating the position by incrementing a received window position with a displacement value.

A further embodiment of an apparatus according to the invention is characterized in that the device comprises a pitch determining unit for determining a local pitch period length from the audio equivalent signal and feeding this pitch period length to the incrementing unit as the displacement value. The pitch meter provides for automatic and robust operation of the apparatus.

According to the invention, an apparatus for manipulating a concatenation of a first and a second audio equivalent signal comprising:

(a) a combining unit, for forming a combination of the first and the second audio equivalent signal, wherein there is formed a relative time position of the second audio equivalent signal with respect to the first audio equivalent signal such that, over time, in the combination during a first time interval only the first audio equivalent signal is active and during a subsequent second time interval only the second audio equivalent signal is active (b) a positioning for locating window positions for time windows with respect to the combination of the first and the second audio equivalent signal; the positioning unit feeding the window positions to (c) a segmenting unit for deriving segment signals from the first and the second audio equivalent signal by weighting the first and the second audio equivalent signal as a function of position in the corresponding windows, the segmenting unit feeding the segment signals to (d) a superposing unit for superposing selected segment signals to form an output signal of the device, is characterized in that the positioning unit comprises an incrementing unit for locating the positions by incrementing received window positions with respective displacement values, and the combining unit comprises an optimal position selection unit for selecting the position in time of the second audio equivalent signal so as to minimize a transition criterion representative of an audible effect in the output signal between where the output signal is formed by superposing segment signals derived from either the first or second time interval exclusively. This allows for the concatenation of signals such as diphones.

BRIEF DESCRIPTION OF THE DRAWINGS

These and other advantages of the method according to the invention will be further described in accordance with the drawings, in which FIG. 1 schematically shows the result of steps of a known method for changing the pitch of a periodic signal;

FIGS. 5*a–e* show speech signals with window windows placed according to the invention;

FIGS. 11*a* and *b* show two concatenated diphone signals;

FIGS. 12*a* and *b* show two diphone signals concatenated according to the invention; and FIG. 13 shows an apparatus in accordance with the invention for concatenating two signals.

DETAILED DESCRIPTION OF PREFERRED EMBODIMENTS OF THE INVENTION

Pitch and/or Duration Manipulation

Figure 1:
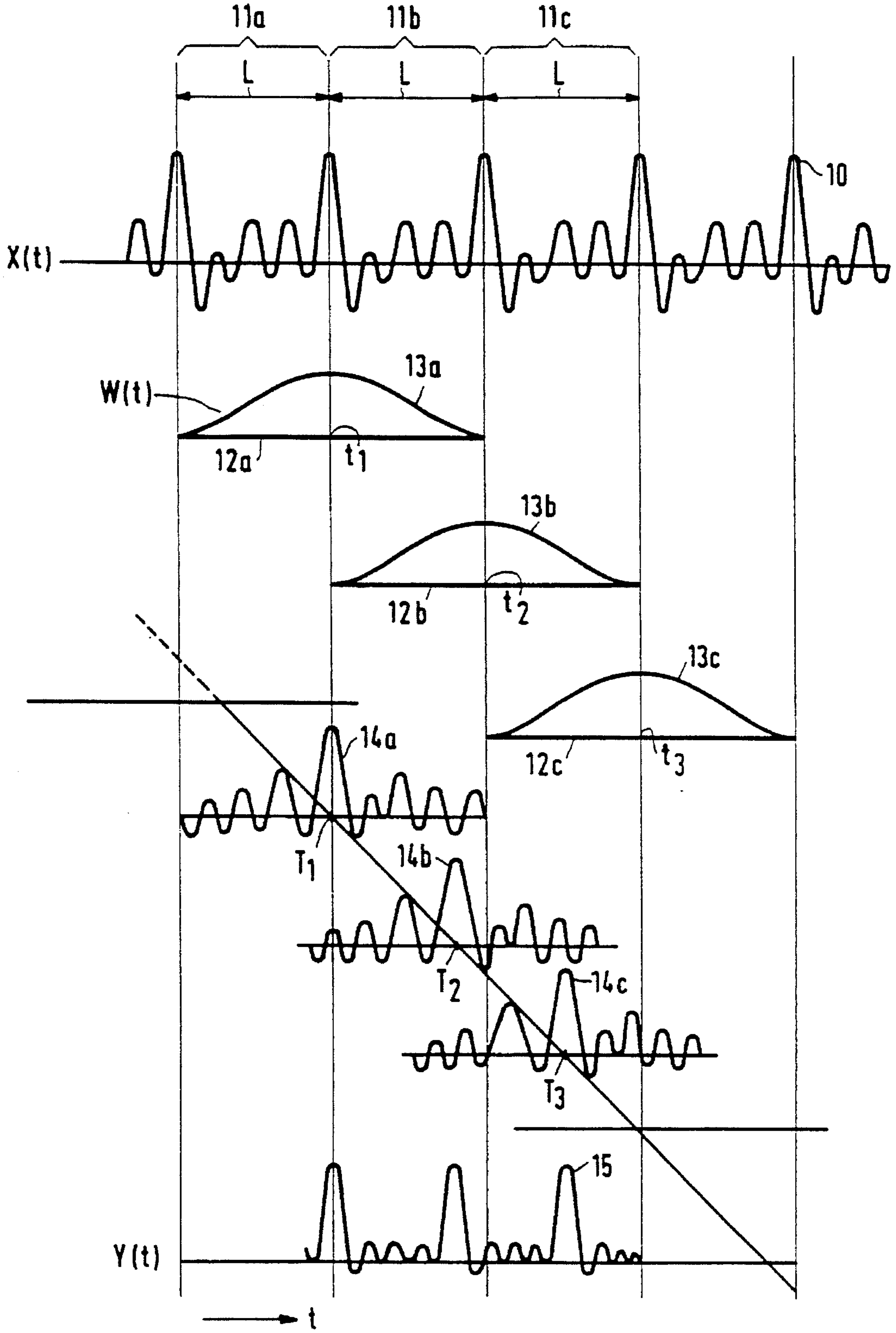
FIG. 1 PRIOR ART

FIG. 1 shows the steps of a known method used for changing (in FIG. 1, for example, raising) the pitch of a periodic input audio equivalent signal X(t) 10. In FIG. 1, the signal X(t) repeats itself after successive periods, 11*a*, 11*b* and 11*c*, of length L. In order to change the pitch of the signal X(t), successive windows, 12*a*, 12*b* and 12*c*, centered at time points "$t_i$" (i=1, 2 and 3), are laid over the signal X(t). In FIG. 1, these windows each extend over two periods of length L and to the center of the next window. As a result, each point in time of the signal X(t) is covered by two windows. With each window, 12*a*, 12*b* and 12*c*, a window function W(t) is associated therewith (see 13*a*, 13*b* and 13*c*, respectively). For each window 12*a*, 12*b* and 12*c*, a corresponding segment signal $S_i(t)$ is extracted from the signal X(t) by multiplying the periodic audio equivalent signal inside the window by the window function W(t). A segment signal $S_i(t)$ is obtained as follows:

$$S_i(t)=W(t)X(t-t_i)$$

The window function W(t) is self complementary in the sense that the sum of the overlapping windows is independent of time, i.e., $$W(t)+W(t-L)=\text{constant}$$

for t between 0 and L. This condition is met when $$W(t)=\tfrac{1}{2}+A(t)\cos(180t/L+\Phi(t)),$$

where A(t) and Φ(t) are periodic functions of t, with a period of length L. A typical window function W(t) is obtained when A(t)=½ and Φ(t)=0.

The segment signals $S_i(t)$ are superposed to obtain an output signal Y(t) 15. However, in order to change the pitch, the segment signals $S_i(t)$ are not superposed at their original positions $t_i$, but at new positions $T_i$ (i=1, 2 and 3), see 14*a*, 14*b* and 14*c*, in FIG. 1, with the centers of the segment signals $S_i(t)$ closer together in order to raise the pitch value. (To lowering the pitch value, they would be wider apart.) Finally, the segment signals $S_i(t)$ are summed to obtain the signal Y(t), which can be expressed as:

$$Y(t)=\Sigma_i' S_i(t-T_i)$$

(The sum is limited to indices i for which $-L<t-T_i<L$).

By nature of its construction, the signal Y(t) will be periodic if the signal X(t) is periodic, but the period of the signal Y(t) differs from the period of the signal X(t) by a factor:

$$(t_i-t_{i-1})/(T_i-T_{i-1}),$$

i.e., as much as the mutual compression of distances between the segment signals $S_i(t)$ as they are placed for the superposition 14*a*, 14*b* and 14*c*. If the segment distance is not changed, the signal Y(t) exactly reproduces the signal X(t).

FIGS. 2*a–d* show the effect of the above-described operations in the frequency spectrum. The frequency spectrum of signal X(t), i.e., X(f) (which one can obtain by taking a Fourier transform of X(t)) is depicted as a function of frequency in FIG. 2*a*. Because the signal X(t) is periodic, its frequency spectrum is made of individual peaks (See 21*a*, 21*b* and 21*c*) which are successively separated by frequency intervals 2π/L, corresponding to the inverse of the period of length L. The amplitude of the peaks depends on frequency, and defines a spectral envelope 23, which is a smooth function running through the peaks. Multiplication of the signal X(t) with the window function W(t), corresponds, in the frequency spectral, to convolution (or smearing) with the fourier transform of the window function W(t), i.e., W(f). As a result, the frequency spectrum of each segment is a sum of smeared peaks.

Figures 2A, 2B, 2C, 2D:
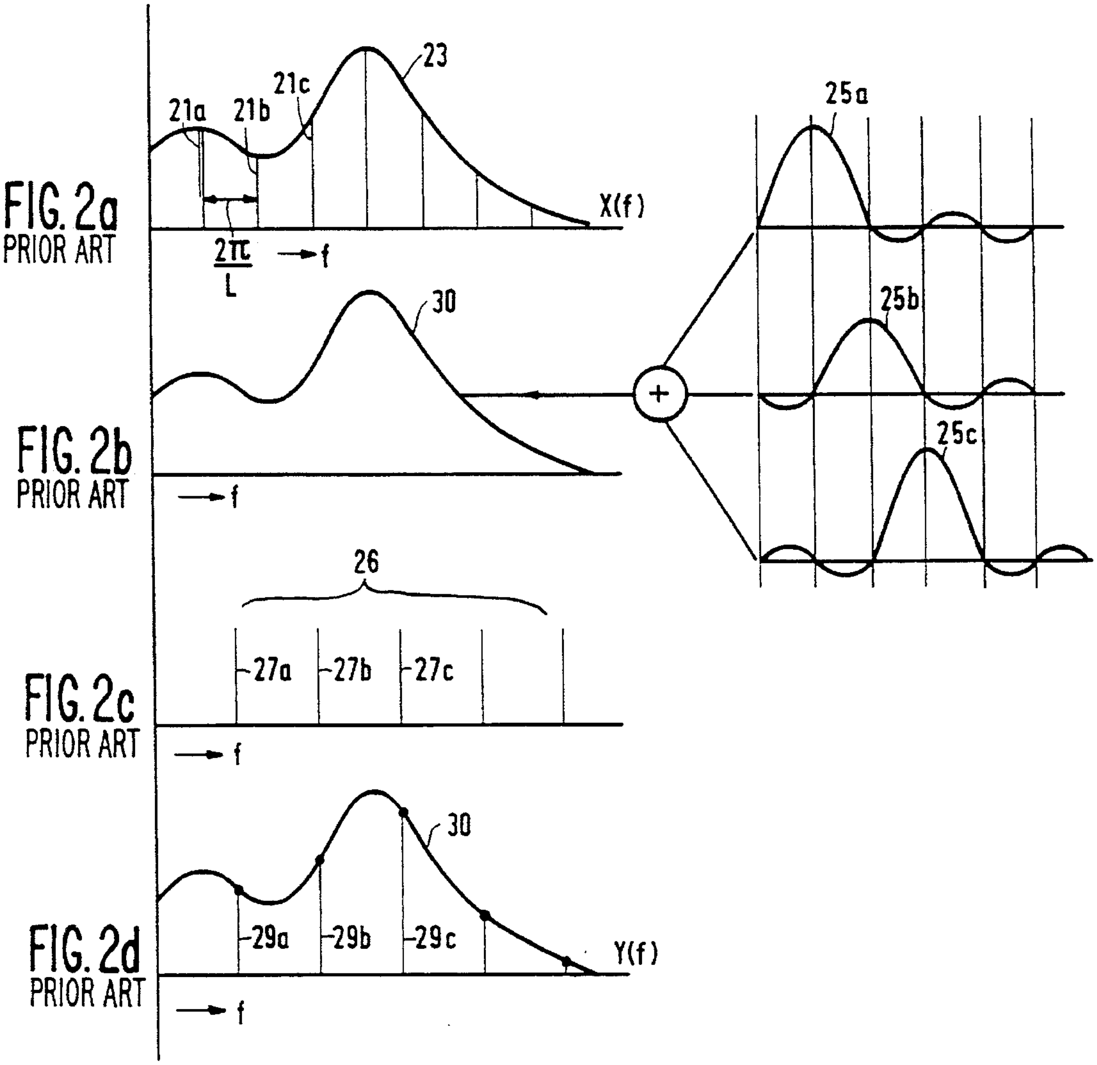
FIG. 2a PRIOR ART
FIG. 2b PRIOR ART
FIG. 2c PRIOR ART
FIG. 2d PRIOR ART
FIGS. 2*a–d* show the effect of a known method for changing the pitch of a periodic signal upon the frequency spectrum of the signal.

In FIG. 2*b*, the frequency spectrum of the smeared peaks 25*a*, 25*b*, 25*c* (for original peaks 21*a*, 21*b* and 21*c*) and their sum 30 are shown for a single segment. Due to the self complementarity condition of the window function W(t), the smeared peaks are zero at multiples of 2π/L from the central peak. At the position of the original peaks, the sum 30 has the same value as the frequency spectrum of the signal X(t). Since each peak dominates the contribution to the sum 30 at its center frequency, the sum 30 has approximately the same shape as the spectral envelope 23 of the signal X(t).

When the segments are placed at regular distances for superposition, and are summed in superposition in the time domain, this corresponds, in the frequency spectrum to multiplication of the sum 30 with a raster 26 of peaks 27*a*, 27*b* and 27*c*, shown in FIG. 2*c*, which are separated by frequency intervals corresponding to the inverse of the regular distances at which the segments are placed. The resulting frequency spectrum is shown in FIG. 2*d*, and it constitutes the frequency spectrum of Y(t), i.e., Y(f). Y(f) is made up of peaks at the same distances, corresponding, in the time domain, to a periodic signal with a new period equal to the distance between successive segments. Y(f) has the spectral envelope of the sum 30, which is approximately equal to the original spectral envelope 23 of the input signal.

In this way, the known method transforms periodic signals into new periodic signals with a different period, but having approximately the same spectral envelope. The known method may be applied equally well to signals which are only locally periodic, with the period of length L varying in time, i.e., with a period of length $L_i$ for the ith period, like, for example, voiced speech signals or musical signals. In such cases, the length of the windows must be varied in time as the length of the period varies, and the window function W(t) must be stretched in time by a factor $L_i$, corresponding to the local period, to cover such windows, i.e.:

$$S_i(t)=W(t/L_i)X(t-t_i).$$

Moreover, in order to preserve the self complementarity of the window function (i.e., the property that W1(t)+W2(t−L)=a constant for two successive windows W1 and W2), it is desirable to make the window function comprise separately stretched left and right parts (for t<0 and t>0, respectively):

$$S_i(t)=W(t/L_i)X(t+t_i)(-L_i<t<0)$$

$$S_i(t)=W(t/L_{i+1})X(t+t_i)(0<t<L_{i+1}).$$

Each part is stretched with its own factor ($L_i$ and $L_{i+1}$, respectively). These factors are identical to the corresponding factors of the respective left and right overlapping windows.

Experiments have shown that locally periodic input audio equivalent signals can be used to produce, in accordance with the method described above, output signals which to the human ear have the same quality as the input audio equivalent signal, but with a raised pitch. Similarly, by placing the segments farther apart than in the input signals, the perceived pitch may be lowered.

The method described above may also be used to change the duration of a signal. To lengthen the signal, some segment signals are repeated in the superposition, and, therefore, a greater number of segment signals, than that derived from the input signal, is superimposed. Conversely, the signal may be shortened by skipping some segments.

In fact, when the pitch is raised, the signal duration is also shortened, and it is lengthened in case of a pitch lowering. Often this is not desired, and in this case counteracting signal duration transformations, e.g., skipping or repeating some segments, will have to be applied when the pitch is changed.

Placement of Windows

To effect pitch or duration manipulation, it is necessary to determine the position of the windows first. The known method teaches that in speech signals, the windows should be centered at voice marks, i.e., points in time where the vocal cords are excited. Around such points, particularly at the sharply defined point of closure, there tends to be a larger signal amplitude (especially at higher frequencies).

Figures 3A, 3B, 3C, 3D, 3E, 3F, 3G:
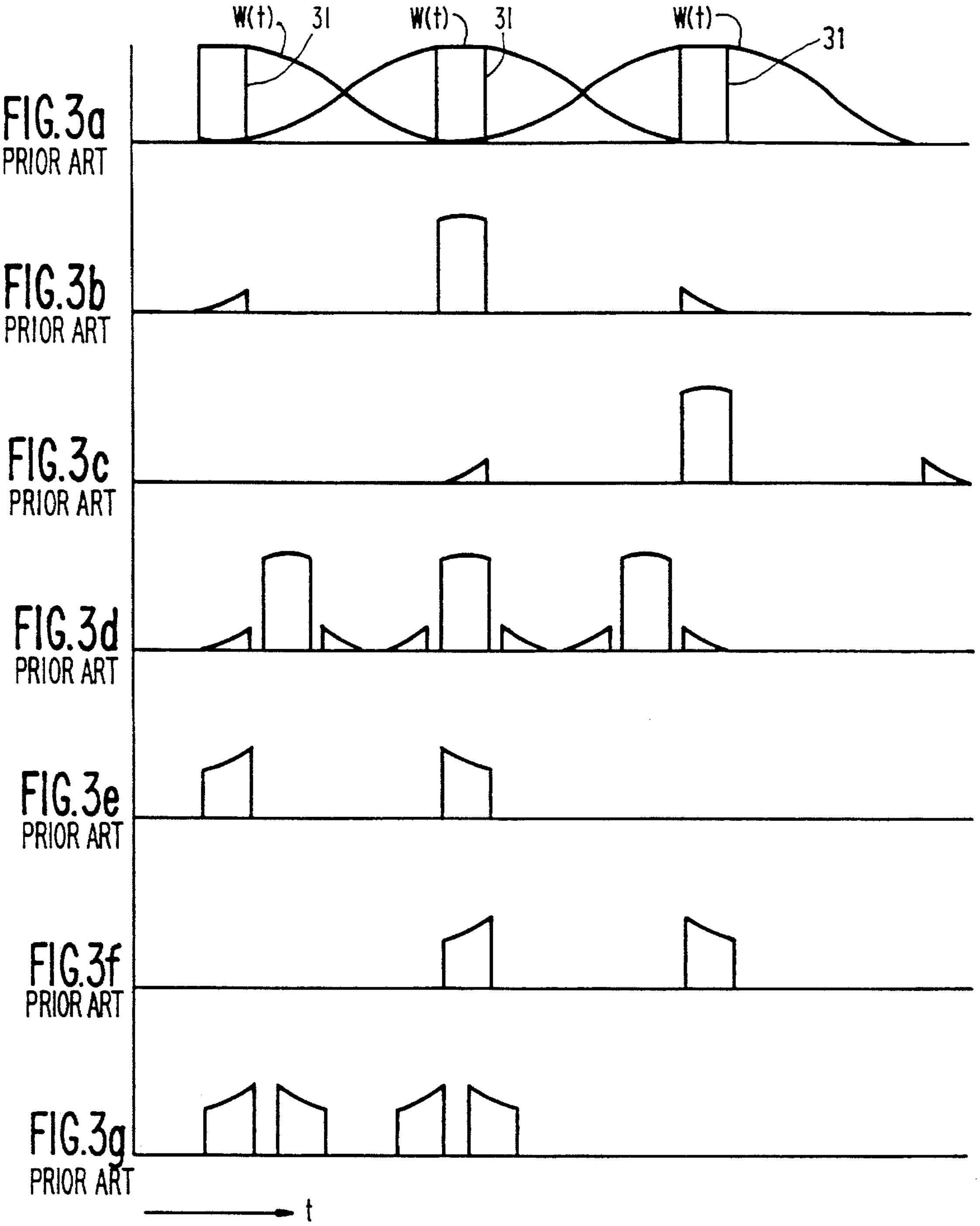
FIG. 3a PRIOR ART
FIG. 3b PRIOR ART
FIG. 3c PRIOR ART
FIG. 3d PRIOR ART
FIG. 3e PRIOR ART
FIG. 3f PRIOR ART
FIG. 3g PRIOR ART
FIGS. 3*a–g* show the effect of signal processing upon a signal concentrated in periodic time intervals.

For a periodic signal in which its intensity is concentrated in a short interval of its period, centering the windows around such intervals will lead to the most faithful reproduction of that signal. This is shown in FIGS. 3*a–g* for a signal containing short periodic rectangular pulses 31 (see FIG. 3*a*). When the windows are placed at the center of those pulses (see FIG. 3*a*), a segment will contain a large pulse and two small residual pulses from the boundary of the windows. (Two of those segments are shown in FIGS. 3*b* and 3*c*.) A pitch raised output signal will then contain the large pulse and residual pulses from the segments. (See FIG. 3*d*) However, when the windows are placed midway between two pulses, the segments will contain two equally large pulses (which are smaller than the large pulses of FIGS. 3*b*–*d*). (Two of those segments are shown in FIG. 3*c* and 3*f*.) The output signal from those segments will now contain twice as many pulses as the input signal. (See FIG. 3*g*) Hence, to ensure faithful reconstruction of concentrated signals, it is preferable to place the windows such that they are centered around the pulses.

In natural speech, the speech signal is not limited to pulses, because of resonance effects like the filtering effect of the vocal tract, but the high frequency signal content tends to be concentrated around the moments where the vocal cords are closed. Surprisingly, in spite of this, it has been found, in most cases, that for good perceived quality in speech reproduction, it is not necessary to center the windows around voice marks corresponding to moments of excitation of the vocal cords or, for that matter, at any detectable event in the speech signal. Rather, it has been found that it is much more important that a proper window length and regular spacing are used. Experiments have shown that an arbitrary position of the windows with respect to the moment of vocal cord excitation, and even slowly varying positions yield good quality audible signals, whereas incorrect window lengths and irregular spacing yield audible disturbances.

According to the invention, the windows are placed incrementally at period lengths apart, i.e., without an absolute phase reference. Thus, only the period lengths, and not the moments of vocal cord excitation, or any other detectable event in the speech signal are needed for window placement. This is advantageous, because the period length, i.e., the pitch value, can be determined much more robustly than moments of vocal cord excitation. Hence, it will not be necessary to maintain a table of voice marks which, to be reliable, must often be edited manually.

Figure 4A:
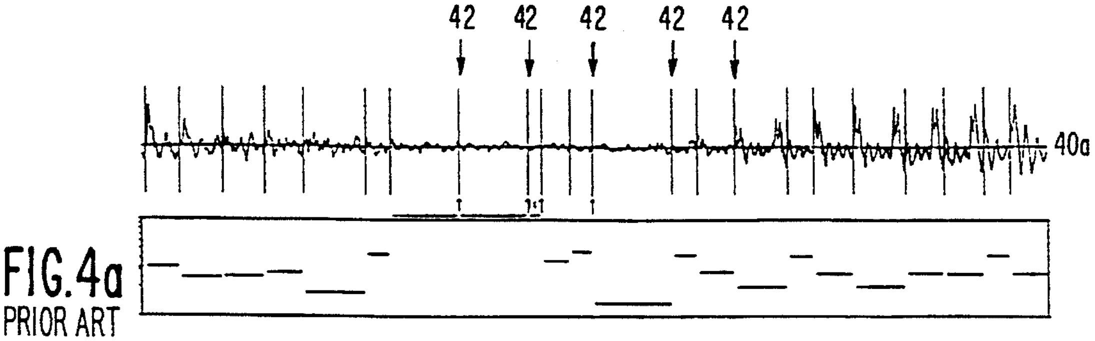
FIG.4a PRIOR ART
FIGS. 4*a–c* show speech signals with windows placed using visual marks in the signal.
Figure 4B:
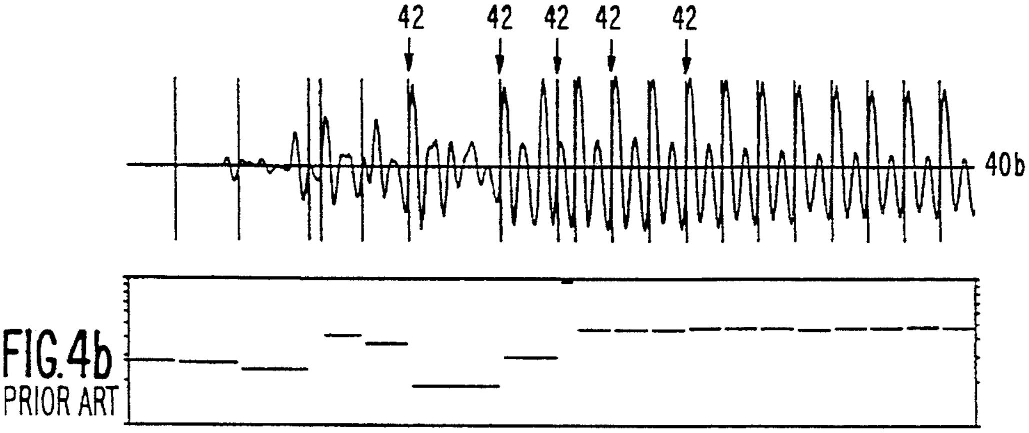
FIG.4b PRIOR ART
Figure 4C:
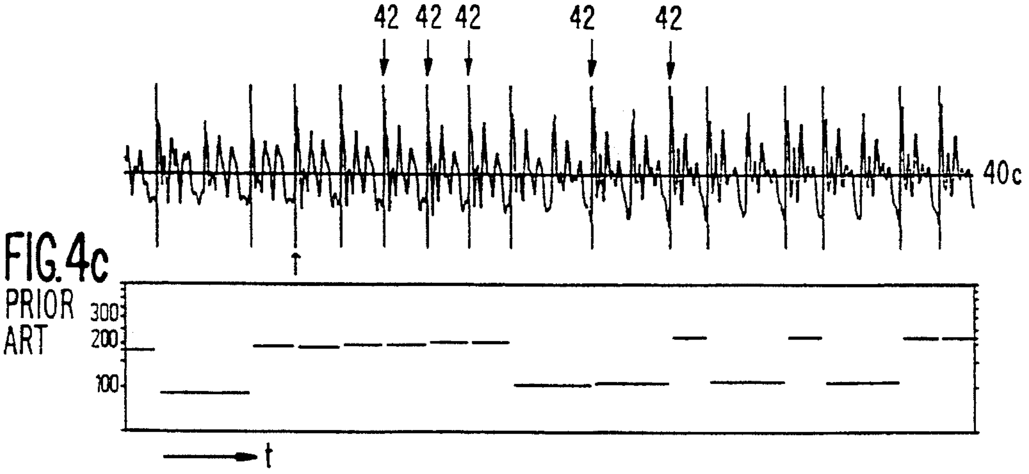

To illustrate the kind of errors which typically occur in vocal cord excitation detection, or any other methods which select some detectable event in a speech waveform, reference is made to FIGS. 4*a*–*c*. FIGS. 4*a*, 4*b* and 4*c* show speech signals 40*a*, 40*b* and 40*c*, respectively with marks based on the detection of moments of closure of the vocal cords ("glottal closure") indicated by vertical lines 42 (only some of those lines are referenced). Below each speech signal, the length of the successive windows obtained is indicated on a logarithmic scale. Although the speech signals are reasonably periodic, and of good perceived quality, it is very difficult to consistently place the detectable events. This is because the nature of the speech signals may vary widely from sound to sound as in FIGS. 4*a*, 4*b*, 4*c*. Furthermore, relatively minor details may decide the placement, like a contest for the role of biggest peak among two equally big peaks in one pitch period.

Typical methods of pitch detection use the distance between peaks in the frequency spectrum of a signal (e.g., in FIG. 2 the distance between the first and second peaks 21*a* and 21*b*) or the position of the first peak. A method of this type is known, for example, from the above-mentioned article by D. J. Hermes. Other methods select a period which minimizes the change in a signal between successive periods. Such methods can be quite robust, but they do not provide any information on the phase of the signal and, therefore, can only be used once it is realized that incrementally placed windows, i.e., windows without fixed phase reference with respect to moments of glottal closure, yield good quality speech.

Figure 5A:
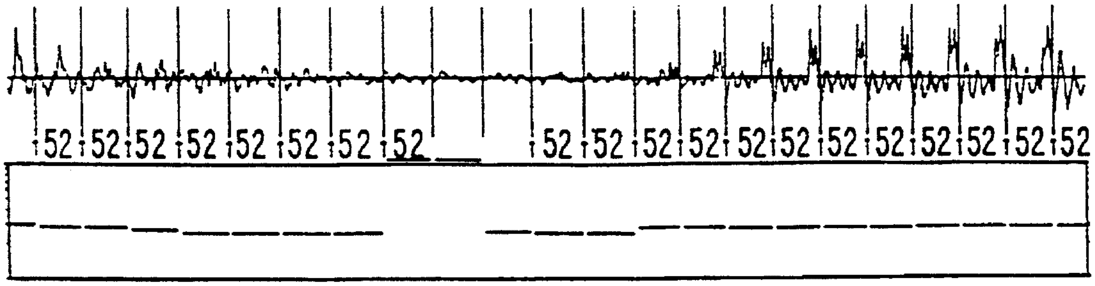
Figure 5B:
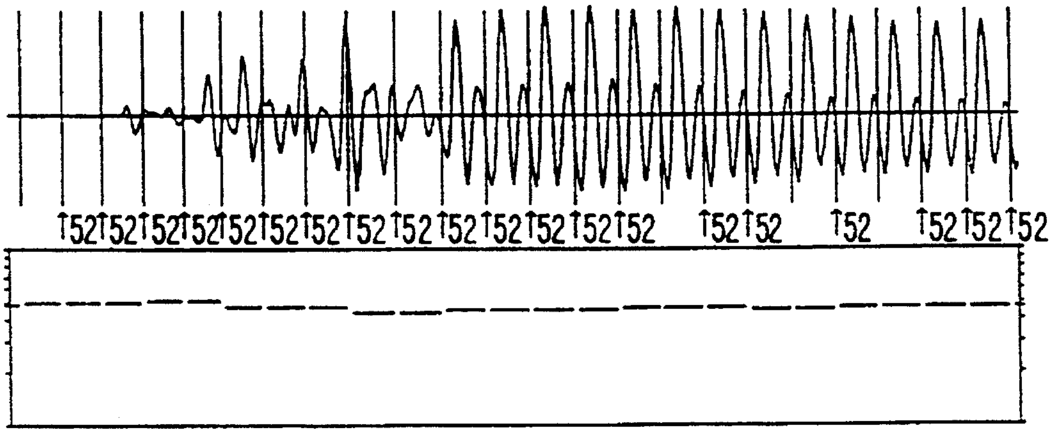
Figure 5C:
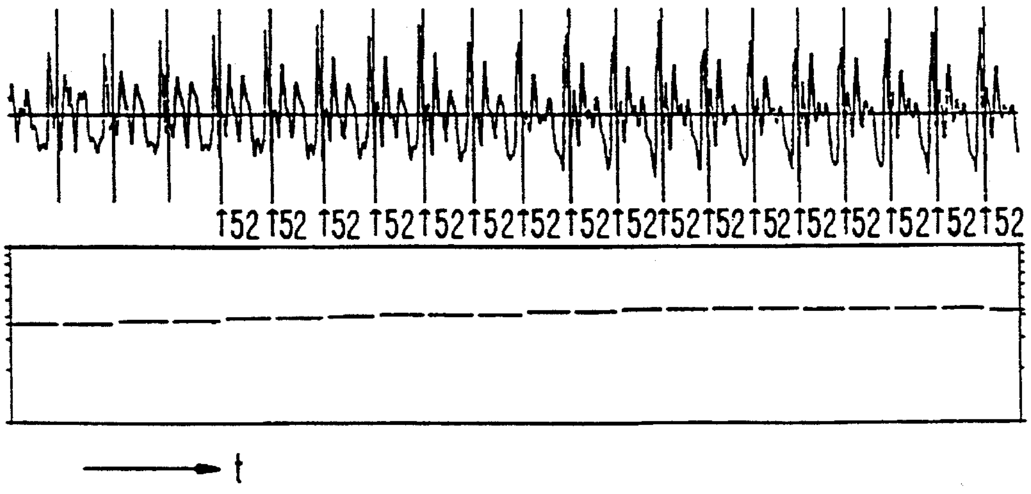

FIGS. 5*a*, 5*b* and 5*c* show the same speech signals as FIGS. 4*a*, 4*b* and 4*c*, respectively, but with marks 52 placed apart by distances determined with a pitch meter (as described in the reference cited above), i.e., without a fixed phase reference. In FIG. 5*a*, two successive periods where marked as voiceless (this is indicated by placing their pitch period length indication outside the scale). The marks where obtained by interpolating the period length. It will be noticed that although the pitch period lengths were determined independently (i.e.,), no smoothing other than that inherent in determining spectra of the speech signal extending over several pitch periods was applied to obtain a regular pitch development) a very regular pitch curve was obtained automatically.

The incremental placement of windows also leads to an advantageous solution of another problem in speech manipulation. During manipulation, windows are also required for unvoiced stretches, i.e., stretches containing fricatives, for example, in the sound "ssss", in which the vocal cords are not excited. In an embodiment of the invention, the windows are placed incrementally just like for voiced stretches, only the pitch period length is interpolated between the lengths measured for voiced stretches adjacent to the voiced stretch. This provides regularly spaced windows without audible artefacts, and without requiring special measures for the placement of the windows.

The placement of windows is very easy if the input audio equivalent signal is monotonous, i.e., its pitch is constant in time. In this monotonous case, the windows may be placed simply at fixed distances from each other. In an embodiment of the invention, this is made possible by preprocessing the signal, so as to change its pitch to a single monotonous value. For this purpose, the method according to the invention itself may be used, with a measured pitch, or, for that matter, any other pitch manipulation method. The final manipulation to obtain a desired pitch and/or duration starting from the monotonized signal obtained in this way can then be performed with windows at fixed distances from each other.

An Exemplary Apparatus

Figure 6:
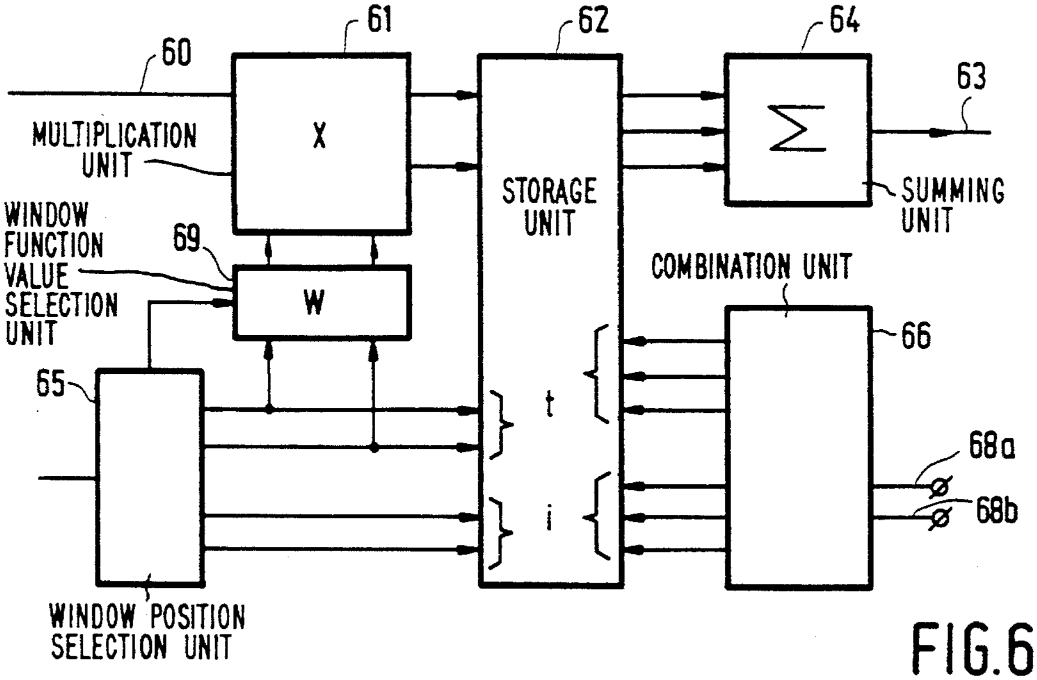
FIG. 6 shows an apparatus for changing the pitch and/or duration of a signal in accordance with the invention.

FIG. 6 shows an apparatus for changing the pitch and/or duration of an audible signal in accordance with the invention. It must be emphasized that the apparatus shown in FIG. 6 and the following figures discussed with respect to it merely serve as an example of one way to implement the method according to the invention. Other apparatus are conceivable without deviating from the method according to the invention.

In the apparatus of FIG. 6, an input audio equivalent signal arrives at an input 60, and the output signal leaves at an output 63. The input signal is multiplied by the window function in a multiplication unit 61 and stored segment signal by segment signal in segment slots in a storage unit 62. To synthesize the output signal at output 63, speech samples from various segment signals are summed in a summing unit 64.

The manipulation of speech signals, in terms of pitch change and/or duration manipulation, is effected by addressing the storage unit 62 and selecting window function values. Selection of storage addresses for storing the segments is controlled by a window position selection unit 65, which also controls a window function value selection unit 69. Selection of readout addresses from the storage unit 62 is controlled by combination unit 66.

In order to explain the operation of the components of the apparatus shown in FIG. 6, it is recalled that signal segments Si are derived from an input signal X(t) (at 60), the segment signal being defined by:

$$S_i(t)=W(t/L_i)X(t+t_i)(-L_i<t<0)$$

$$S_i(t)=W(t/L_{i+1})X(t+t_i)(0<t<L_{i+1}),$$

and that those segments are superposed to produce an output signal Y(t) (at 63) defined by:

$$Y(t)=\Sigma_i{'}S_i(t-T_i)$$

(the sum being limited to indices i for which $-L_i<t-T_i<L_{i+1}$). At any point in time t', a signal X(t') is supplied at the input 60 which contributes to two segment signal i and i+1 at respective t values $t_a=t'-t_i$ and $t_b=t'-t_{i+1}$ (these being the only possibilities for $-L_i<t<L_{i+1}$).

Figure 7:
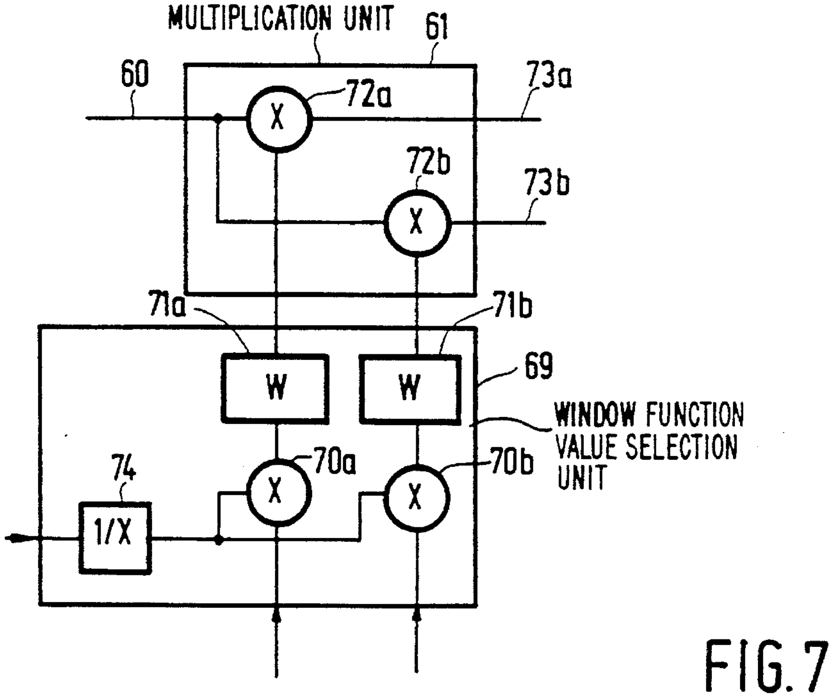
FIG. 7 shows a multiplication unit and a window function value selection unit in accordance with the invention for use in an apparatus for changing the pitch and/or duration of a signal.

FIG. 7 shows the multiplication unit 61 and the window function value selection unit 69. The respective t values $t_a$ and $t_b$, described above, are multiplied by the inverse of a period of length $L_{i+1}$ (determined from the period length in an inverter 74) in scaling multipliers **70*a* and 70*b* to determine the corresponding arguments of the window function W. These arguments are supplied to window function evaluators 71*a* and 71*b* (implemented, for example, in case of discrete arguments as a lookup table) which output the corresponding values of the window function W. Those values of the window function are multiplied with the input signal in two multipliers 72*a* and 72*b*. This produces the segment signal values $S_i$ and $S_{i+1}$ at two inputs 73*a* and 73*b* to the storage unit 62**.

Those segment signal values are stored in the storage unit 62 in segment slots at addresses in the slots corresponding to their respective time point values $t_a$ and $t_b$ and to respective slot numbers. These addresses are controlled by the window position selection unit 65. A window position selection unit suitable for implementing the invention is shown in FIG. 8.

Figure 8:
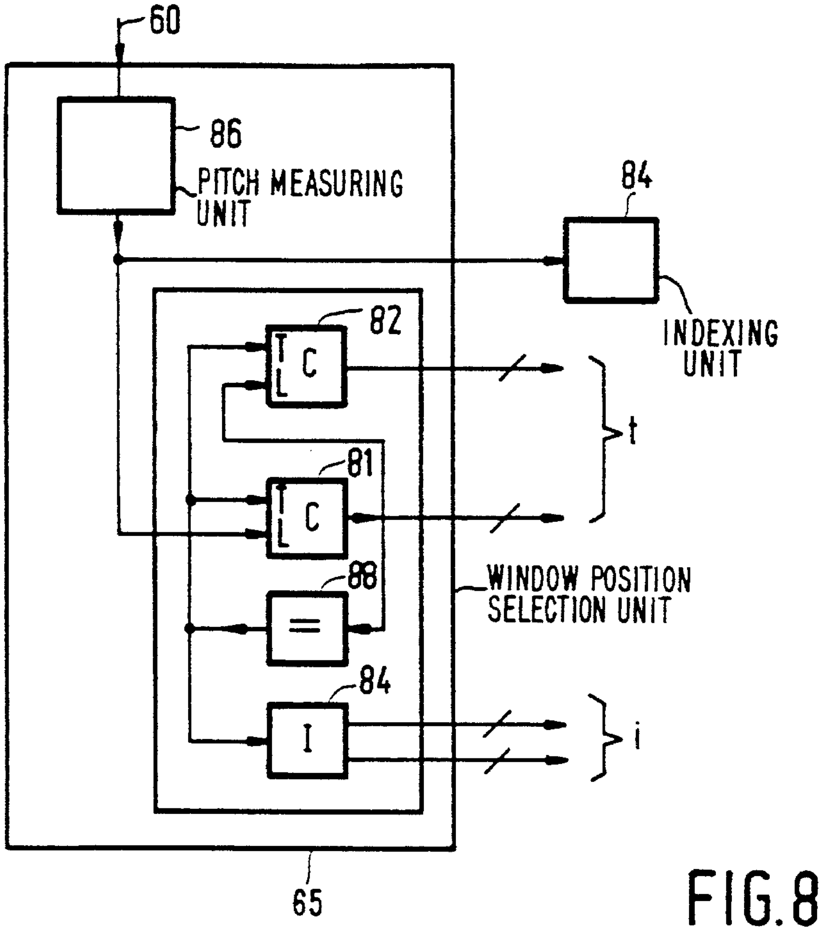
FIG. 8 shows a window position selection unit for implementing the invention.

The time point values $t_a$ and $t_b$ are addressed by counters 81 and 82 of FIG. 8, and the slot numbers are addressed by an indexing unit 84 of FIG. 8, which outputs the segment indices i and i+1. The counters 81 and 82 and the indexing unit 84 output addresses with a width appropriate to distinguish the various positions within the segment slots and the various slot, respectively (but are shown symbolically only as single lines in FIG. 8.

The two counters 81 and 82 of FIG. 8 are clocked at a fixed clock rate (from a clock which is not shown) and count from an initial value loaded from a load input (L), which is loaded into the counter upon receiving a trigger signal at a trigger input (T). The indexing unit 84 increments the index values upon receiving this trigger signal.

According to one embodiment of the invention, a pitch measuring unit 86 is provided. The pitch measuring unit determines a pitch value from the input 60, controls the scale factor for the scaling multipliers **70*a* and 70*b*, and provides the initial value of the first counter 81 (the initial count being minus (i.e., the negative of) the pitch value). The trigger signal is generated internally in the window position selection unit 65, once the counter 81 reaches zero, as detected by a comparator 88. This means that successive windows are placed by incrementing the location of a previous window by the time needed for the first counter 81** to reach zero.

In another embodiment of the invention, a monotonized signal is applied to the input 60 (this monotonized signal being obtained by prior processing in which the pitch is adjusted to a time independent value, either by means of the method according to the invention or by other means). In this monotonized case, a constant value, corresponding to the monotonized pitch is fed as the initial value to the first counter 81. In this monotonized case, the scaling multipliers **70*a* and 70*b*** can be omitted since the windows have a fixed size.

Figure 9:
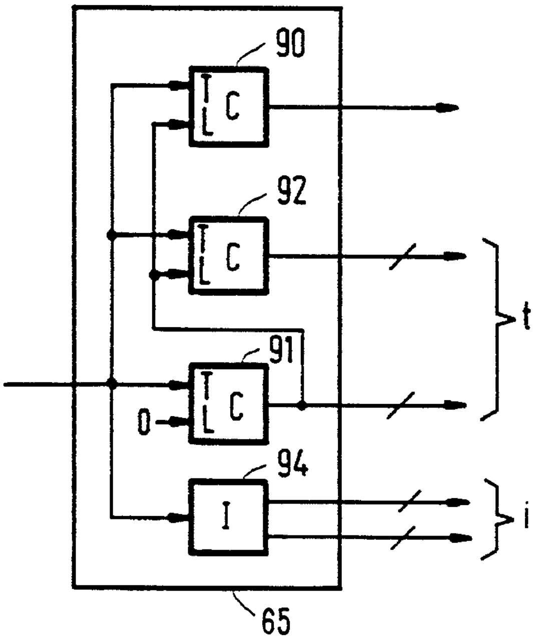
FIG.9 PRIOR ART
FIG. 9 shows a window position selection unit according to the prior art.

In contrast to FIG. 8, FIG. 9 shows an example of an apparatus for implementing the prior art method. Here, the trigger signal is generated externally, at moments of excitation of the vocal cords. The first counter 91 will then be initialized, for example, at zero, after the second counter 92 copies the current value of the first counter 91. The important difference between the apparatus for implementing the prior art method and the apparatus for implementing the invention is that in the apparatus for implementing prior art method the phase of the trigger signal, which places the windows, is determined externally from the window position determining unit 65, and is not determined internally (by the counter 81 and the comparator 88) by incrementing from the position of previous window as is the case for the apparatus for implementing the invention. Furthermore, in the prior art (FIG. 9), the period length is determined from the length of the time interval between moments of excitation of the vocal cords, for example, by copying the content of the first counter 91 at the moment of excitation of the vocal tract into a latch 90, which controls the scale factor in the scaling unit 69.

Figure 10:
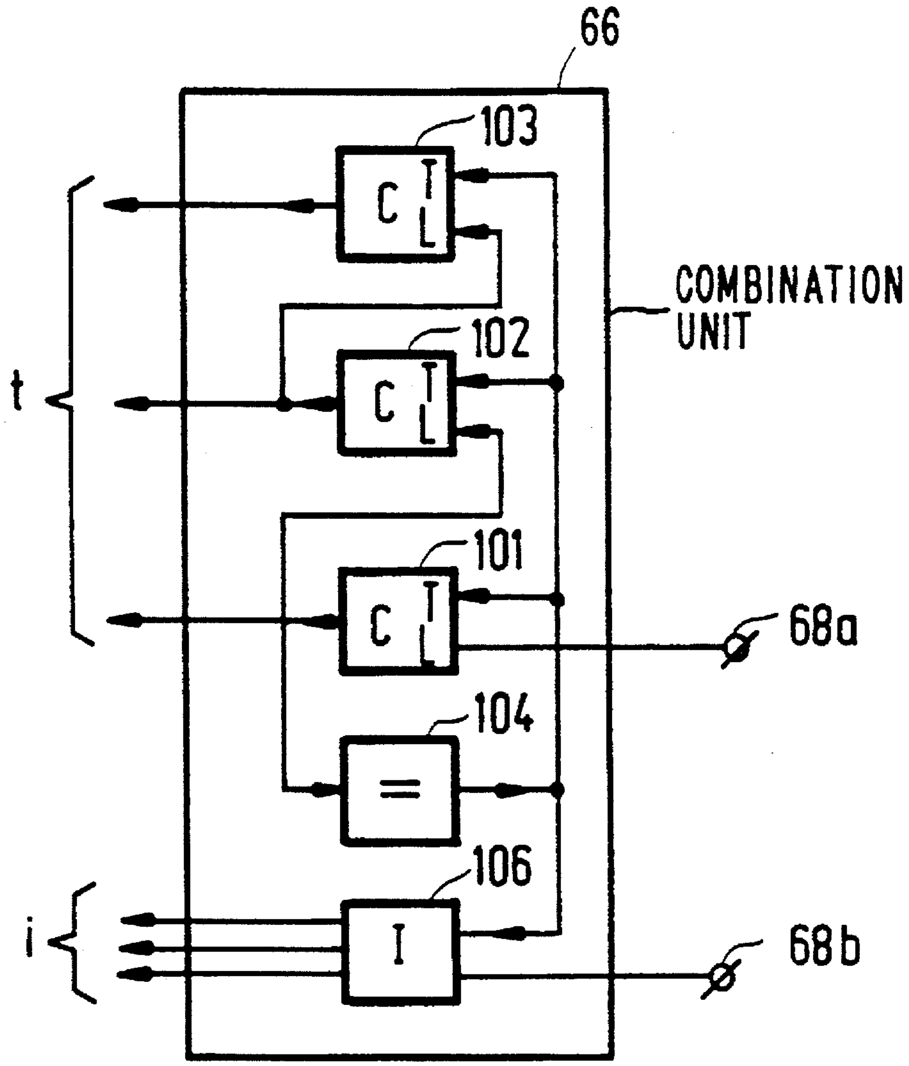
FIG. 10 shows a subsystem for combining several segment signals in accordance with the invention.

The combination unit 66 of FIG. 6 is shown in FIG. 10. The purpose of the outputs of this unit is to superpose segment signal from the storage unit 62 according to $$Y(t)=\Sigma_i{'}S_i(t-T_i)$$

(the sum being limited to index values i for which $-L_i<t-T_i<L_{i+1}$). In principle any number of index values may contribute to the sum at one time point t, but when the pitch is not changed by more than a factor of 3/2, at most 3 index values will contribute at a time. By way of example, therefore, FIGS. 6 and 10 show an apparatus which provides for only three active indices at a time. (Extension to more than three segments is straightforward and will not be discussed further.)

For addressing the segment signal, the combination unit 66 comprises three counters 101, 102 and 103 (clocked with a fixed rate clock which is not shown), outputting the time point values $t-T_i$ for three segment signals. The three counters 101, 102 and 103 receive the same trigger signal which triggers loading of minus (i.e., the negative of) the desired output pitch interval in the first of the three counters 101. Upon receipt of trigger signal, the last position of the first counter 101 is loaded into the second counter 102, and the last position of the second counter 102 is loaded into the third counter 103. The trigger signal is generated by a comparator 104, which detects zero crossing of the first counter 101. The trigger signal also updates the indexing unit 106.

The indexing unit 106 addresses the segment slot numbers which must be read out and the counters 101, 102 and 103 address the positions within the slots. The counters 101, 102 and 103 and the indexing unit 106 address three segments, which are output from the storage unit 62 to the summing unit 64 in order to produce the output signal.

By applying desired pitch interval values at a pitch control input 68*a*, one can control the pitch value. The duration of the speech signal is controlled by a duration control input 68*b* to the indexing unit 106. Without duration manipulation, the indexing unit 106 simply produce three successive segment slot numbers. Upon receipt of the trigger signal, the value of the first and second outputs i, are copied to the second and third outputs i, respectively, and the first output is increased by one. When the duration is manipulated, the first output i is not always increased by one. To increase the duration, the first output is kept constant once every so many cycles, as determined by the duration control input 68*b*. To decrease the duration, the first output is increased by two every so many cycles. The change in duration is determined by the net number of skipped or repeated indices. When the apparatus of FIG. 6 is used to change the pitch and duration of a signal independently (for example, changing the pitch and keeping the duration constant), the duration input 68*b* should be controlled to have a net frequency F at which indices should be skipped or repeated according to $$F=(Dt/T)-1,$$

where D is the factor by which the duration is changed, t is the pitch period length of the input signal and T is the period length of the output signal. A negative value of F corresponds to skipping of indices, which a positive value corresponds to repetition.

FIG. 6 only provides one embodiment of an apparatus in accordance with the invention by way of example. It will be appreciated that one of the principal point according to the invention is the incremental placement of windows based on a previous window.

In addition, there are many ways of generating the addresses for the storage unit 62 according to the teaching of the invention, of which FIG. 8 is but one. For example, the addresses may be generated using a computer program, and the starting addresses need not have the values as given in the example described with FIG. 8.

Moreover, FIG. 6 can be implemented in various ways, for example, using (preferably digital) sampled signals at the input 60, where the rate of sampling may be chosen at any convenient value, for example, 10000 samples per second. Conversely, it may use continuous signal techniques, where the clocks 81, 82, 101, 102 and 103 provide continuous ramp signals, and the storage unit provides for continuously controlled access like, for example, a magnetic disk.

Furthermore, FIG. 6 was discussed as if each time a segment slot is used, whereas in practice segment slots may be reused after some time, as they are not needed permanently. Also, not all components of FIG. 7 need to be implemented by discrete function blocks. Often it may be satisfactory to implement the whole or a part of the apparatus in a computer or a general purpose signal processor.

Diphone Concatenation

In the embodiments of the method according to the invention discussed so far, the windows are placed each time a pitch period from the previous window, and the first window is placed at an arbitrary position. In another embodiment, the freedom to place the first window is used to solve the problem of pitch and/or duration manipulation combined with the concatenation of two stretches of speech having similar speech sounds. This is particularly important when applied to diphone stretches, which are short stretches of speech (typically of the order of 200 milliseconds) containing an initial speech sound, a final speech sound and the transition between them, for example, the transition between "die" and "iem" (as it occurs in the German phrase ". . . die Moeglichkeit . . . "). Diphones are commonly used to synthesize speech utterances which contain a specific sequence of speech sounds, by concatenating a sequence of diphones, each containing a transition between a pair of successive speech sounds, the final speech sound of each speech sound corresponding to the initial speech sound of its successor in the sequence.

The prosody, i.e., the development of the pitch during the utterance, and the variations in duration of speech sounds in synthesized utterances may be controlled by applying the known method of pitch and duration manipulation to successive diphones. For this purpose, these successive diphones must be placed after each other, for example, with the last voice mark of the first diphone coinciding with the first voice mark of the second diphone. In this situation, there is a problem in that artefacts, i.e., unwanted sounds, may become audible at the boundary between concatenated diphones. The source of this problem is illustrated in FIGS. 11*a* and 11*b*.

In FIG. 11*a*, the signal 112 at the end of a first diphone at the left is concatenated at the arrow 114 to the signal 116 of a second diphone. This leads to a signal jump in the concatenated signal. In FIG. 11*b*, the two signals have been interpolated after the arrow 114. A visible distortion remains, however, which is also audible as an artefact in the output signal.

This kind of artefact can be prevented by shifting the second diphone signal with respect to the first diphone signal in time. The amount of the shifting is chosen to minimize a difference criterion between the end of the first diphone and the beginning of the second diphone. Many choices are possible for the difference criterion. For example, one may use the sum of absolute values or squares of the differences between the signal at the end of the first diphone and an overlapping part (for example, one pitch period) of the signal at the beginning of the second diphone, or some other criterion which measures perceptible transition phenomena in the concatenated output signal. After shifting, the smoothness of the transition between diphones can be further improved by interpolation of the diphone signals.

FIGS. 12*a* and 12*b* show the result of this operation for the signals 112 and 116 of FIG. 11*a*. In FIG. 12*a* the signals are concatenated at the arrow 114. The minimization according to the invention has resulted in a much reduced phase jump. After interpolation has been performed, the results of which are shown in FIG. 12*b*, very little visible distortion is left, and experiments have shown that the transition is much less audible. However, shifting of the second diphone signal implies shifting of its voice marks with respect to those of the first diphone signal, and this will produce artefacts when the known method of pitch manipulation is used.

Using the method according to the invention, this problem can be solved in several ways. An example of a first apparatus for doing this is shown in FIG. 13.

The apparatus of FIG. 13 comprises three pitch manipulation units 131*a*, 131*b* and 132. The first and second pitch manipulation units 131*a* and 131*b* are used to monotonize two diphones produced by two diphone production units 133*a* and 133*b*. By monotonizing, it is meant that their pitch is changed to a reference pitch value, which is controlled by a reference pitch input 134. The resulting monotonized diphones are stored in two memories 135*a* and 135*b*. An optimum phase selection unit 136 reads the end of the first monotonized diphone from the first memory 135*a* and the beginning of the second monotonized diphone from the second memory 135*b*. The optimum phase selection units 136 selects a starting point of the second diphone which minimizes the difference criterion. The optimum phase selection unit 136 then causes the first and second monotonized diphones to be fed to an interpolation unit 137, the second diphone being started at the optimized moment. An interpolation concatenation of the two diphones is then fed to the third pitch manipulation unit 132. The third pitch manipulation unit 132 is used to form the output pitch under control of a pitch control input 138. As the monotonized pitch of the diphones is determined by the reference pitch input 134, it is not necessary that the third pitch manipulation unit 132 comprises a pitch measuring device because according to the invention, succeeding windows are placed at fixed distances from each other, the distance being controlled by the reference pitch value.

It will be appreciated that FIG. 13 serves only by way of example. In practice, monotonization of diphones will usually be performed only once and in a separate step, using a single pitch manipulation unit 131*a* for all diphones and storing them in a memory 135*a*, 135*b* for later use. Moreover, the monotonizing pitch manipulation units 131*a* and 131*b* need not work according to the invention. For concatenation, only the part of FIG. 13 starting with the memories 135*a* and 135*b* onward will be needed, i.e., with only a single pitch manipulation unit and no pitch measuring unit or prestored voice marks.

Furthermore, it is not necessary to use the monotonization step at all. It is also possible to work with unmonotonized diphones, performing the interpolation on the pitch manipulated output signal. All that is necessary is a provision to adjust the start time of the second diphone so as to minimize the difference criterion. The second diphone can then be made to take over from the first diphone at the input of the pitch manipulation unit, or it can be interpolated with it at a point where its pitch period has been made equal to that of the first diphone.

We claim:

1. A method of manipulating an input signal to obtain an output signal having a different pitch and/or duration than the input signal, the method comprising:

positioning a chain of successive overlapping time windows with respect to the input signal, each of the windows, except for a first window in the chain, being positioned by incrementing a position of that window from a corresponding position of a preceding window in the chain by a time interval which is substantially equal to a local pitch period for a portion of the input signal with respect to which that window will be positioned, said incrementing thereby determining where that window is positioned;

deriving segment signals from the input signal and the windows, each of the segment signals being derived by weighting the input signal as a function of position in a corresponding one of the windows; and synthesizing the output signal by chained superposition of the segment signals.

2. The method according to claim 1, wherein the input signal is an audio signal and the method further comprises determining the local pitch period from the audio signal.

3. The method according to claim 2, wherein the local pitch period is determined by maximizing a measure of correlation between the audio signal and the audio signal shifted in time.

4. The method according to claim 2, wherein the local pitch period is determined using a position of a peak amplitude in a frequency spectrum of the audio signal.

5. The method according to claim 2, wherein the audio signal includes speech information with a stretch of unvoiced speech interposed between adjacent stretches of voiced speech, and the local pitch period for the stretch of unvoiced speech is determined by interpolating from local pitch periods determined for the adjacent stretches of voiced speech.

6. The method according to claim 1, further comprising manipulating the input signal so that the input signal has substantially uniform local pitch periods.

7. The method according to claim 1, further comprising deriving the input signal on the basis of overlapping an end portion of a first signal and a beginning portion of a second signal so that the beginning portion of the second signal begins at a position in time relative to the end portion of the first signal which minimizes a criteria which is indicative of a transition phenomenon in the output signal.

8. The method according to claim 7, wherein in deriving the input signal interpolation is performed with respect to the end portion of the first signal and the beginning portion of the second signal.

9. The method as claimed in claim 7, wherein the first signal and the second signal are audio signals and local pitch periods are determined from the first signal and the second signal.

10. The method as claimed in claim 7, further comprising manipulating the first signal and the second signal so that they both have substantially uniform local pitch periods.

11. The method as claimed in claim 1, wherein the output signal is synthesized by using each of the segment signals once.

12. The method as claimed in claim 1, wherein the windows have lengths which are independent of the change in pitch and/or duration between the output signal and the output signal.

13. An apparatus for manipulating an input signal to obtain an output signal having a different pitch and/or duration than the input signal, the apparatus comprising:

positioning means for positioning a chain of successive overlapping time windows with respect to the input signal;

incrementing means for determining a position of each of the windows, except for a first window in the chain, by incrementing from a corresponding position of a preceding window in the chain by a time interval which is substantially equal to a local pitch period for a portion of the input signal with respect to which that window will be positioned;

segmenting means for deriving segment signals from the input signal and the windows, each of the segment signals being derived by weighting the input signal as a function of position in a corresponding one of the windows; and combination means for synthesizing the output signal by chained superposition of the segment signals.

14. The apparatus as claimed in claims 13, further comprising determining means for determining the local pitch period.

15. The apparatus as claimed in claims 13, further comprising derivation means for deriving the input signal on the basis of overlapping an end portion of a first signal and a beginning portion of a second signal, said derivation means being adapted to begin the beginning portion of the second signal at a position in time relative to the end portion of the first signal which minimizes a criterion which is indicative of a transition phenomenon in the output signal.

16. The apparatus according to claim 15, further comprising interpolation means for performing an interpolation with respect to the end portion of the first signal and the beginning portion of the second signal.

17. The apparatus as claimed in claim 13, wherein said combination means synthesizes the output signal by using each of the segment signals once.

18. The apparatus as claimed in claim 13, wherein the windows have lengths which are independent of the change in pitch and/or duration between the output signal and the input signal.

19. A method for producing an output signal from a first signal and a second signal, the method comprising:

overlapping the first and second signals so that a beginning portion of the second signal overlaps an end portion of the first signal, the beginning portion of the second signal beginning at a position in time relative to the end portion of the first signal which minimizes a criteria which is indicative of a transition phenomenon in the output signal;

positioning a chain of successive overlapping time windows with respect to the first and second signals, each of the windows, except for a first window in the chain, being positioned by incrementing a position of the that window from a corresponding position of a preceding window in the chain by a time interval which is substantially equal to a local pitch period for a portion of the first signal, the second signal or a combination of the first and second signals with respect to which that window will be positioned, said incrementing thereby determining where that window is positioned;

deriving segment signals from the first and second signals and the windows, each of the segment signals being derived by weighting the first signal, the second signal or a combination of the first and second Signals as a function of position in a corresponding one of the windows; and synthesizing the output signal by chained superposition of the segment signals.

20. The method according to claim 19, further comprising performing an interpolation with respect to the end portion of the first signal and the beginning portion of the second signal.

21. The method as claimed in claim 19, wherein the first signal and the second signal are audio signals, and the method further comprises determining the local pitch periods from the first signal, the second signal or a combination of the first and second signals.

22. The method as claimed in claim 19, further comprising manipulating the first signal and the second signal so that the first signal and the second signal both have substantially uniform local pitch periods.

23. The method as claimed in claim 19, wherein the output signal is synthesized by using each of the segment signals once.

24. The method as claimed in claim 19, wherein the windows have lengths which are independent of the change in pitch and/or duration between the output signal and the input signal.

25. An apparatus for producing an output signal from a first signal and a second signal, the apparatus comprising:

overlapping means for overlapping the first and second signals so that a beginning portion of the second signal overlaps an end portion of the first signal, said overlapping means being adapted to position the beginning portion of the second signal at a position in time relative to the end portion of the first signal which minimizes a criteria which is indicative of a transition phenomenon in the output signal;

positioning means for positioning a chain of successive overlapping time windows with respect to the first and second signals;

incrementing means for determining a position of each of the windows, except for the first window in the chain, by incrementing from a corresponding position of a preceding window in the chain by a time interval which is substantially equal to a local pitch period for a portion of the first signal, the second signal or a combination of the first and second signals with respect to which that window will be positioned;

segmenting means for deriving segment signals from the first and second signals and the windows, each of the segment signals being derived by weighting the first signal, the second signal or a combination of the first and second signals as a function of position in a corresponding one of the windows; and combination means for synthesizing the output signal by chained superposition of the segment signals.

26. The apparatus as claimed in claim 25, further comprising interpolation means for performing an interpolation with respect to the end portion of the first signal and the beginning portion of the second signal.

27. The apparatus as claimed in claim 25, wherein said combination means synthesizes the output signal by using each of the segment signals once.

28. The apparatus as claimed in claim 25, wherein the windows have lengths which are independent of the change in pitch and/or duration between the output signal and the input signal.

* * * * *